Patented June 6, 1950

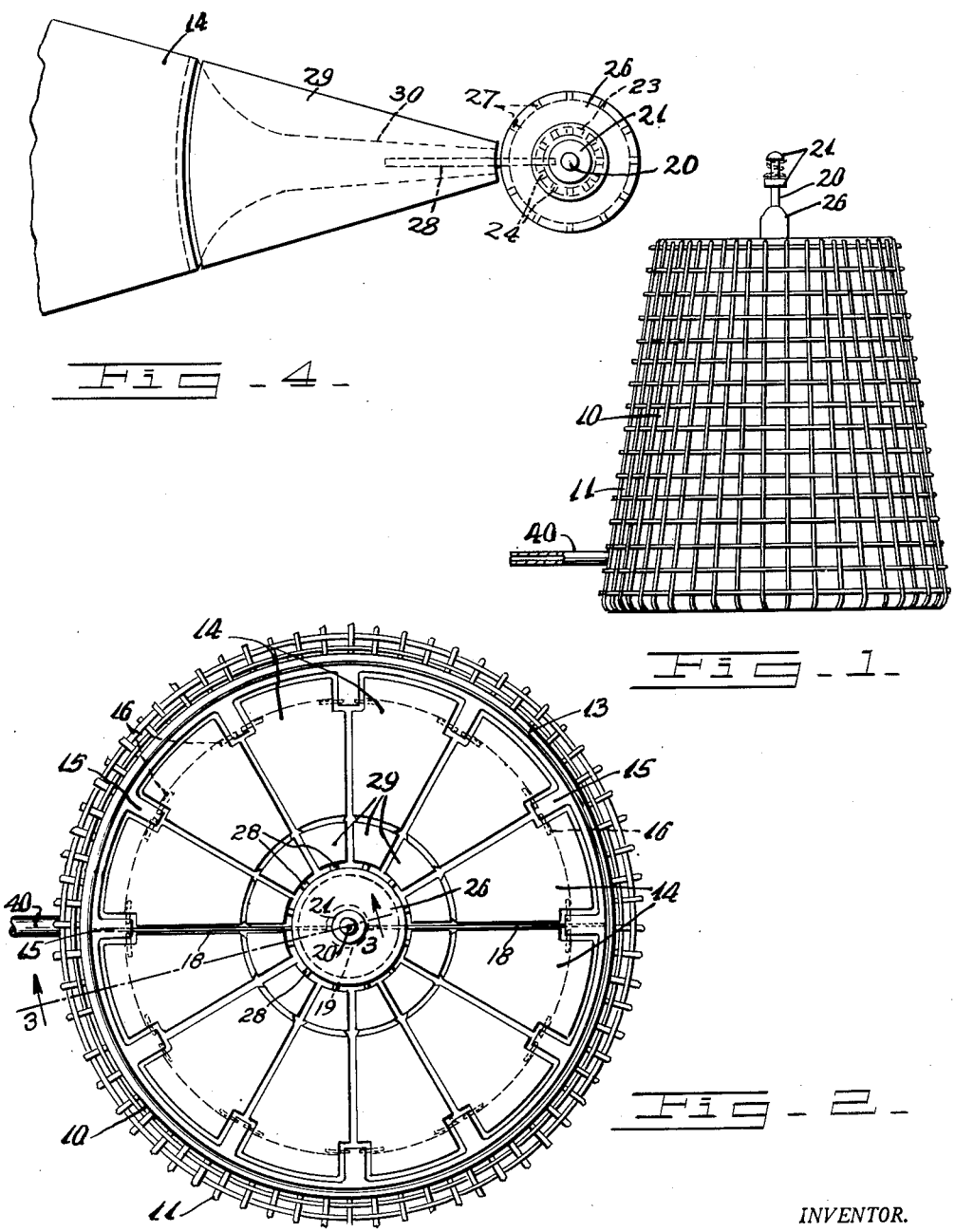

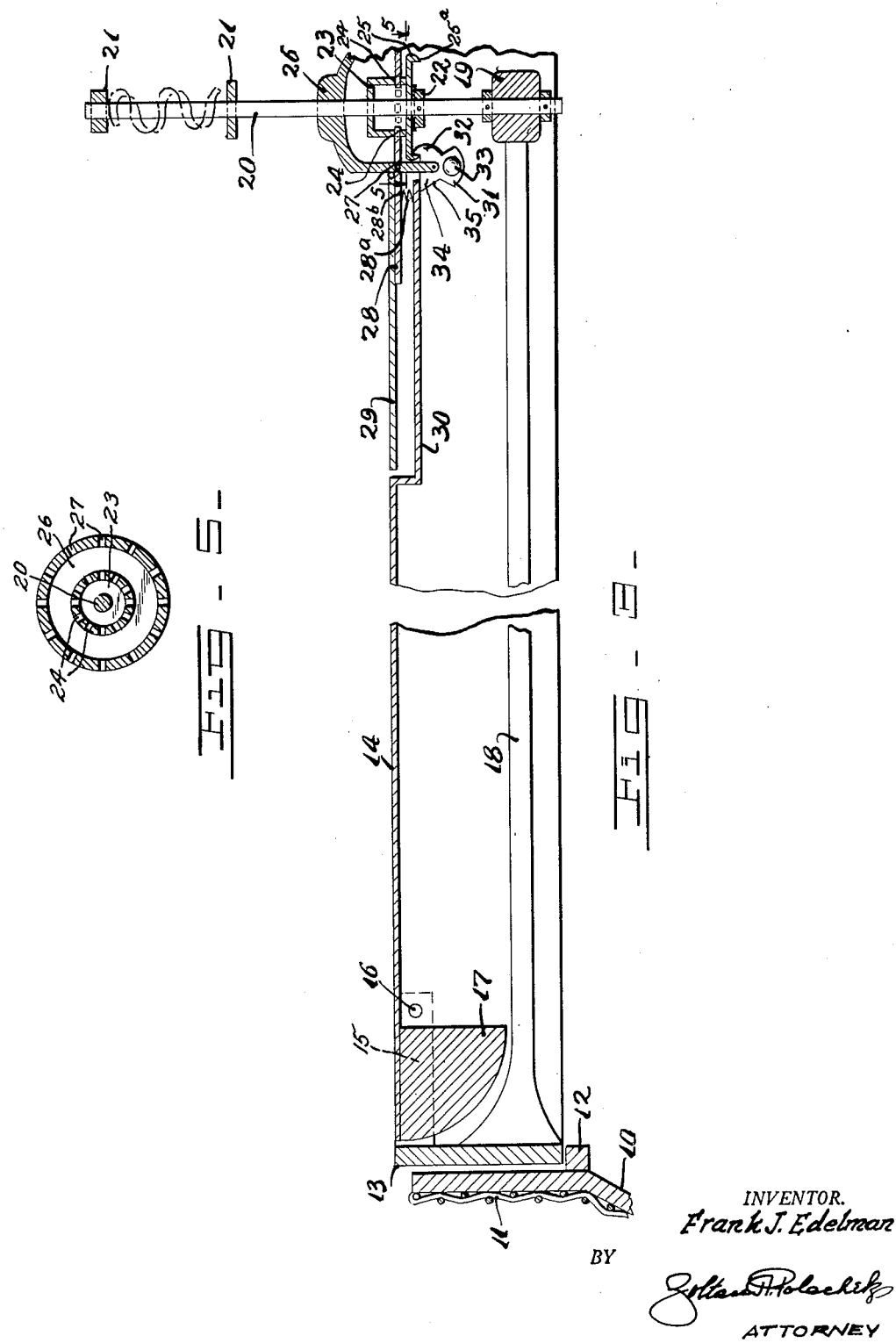

2,510,874

UNITED STATES PATENT OFFICE 2,510,874

AUTOMATIC RATTRAP

Frank J. Edelman, New York, N. Y.

Application June 22, 1944, Serial No. 541,522

7 Claims. (Cl. 43—70)

This invention relates to a new and useful improvement in an automatic rat trap.

More specifically, the invention proposes the construction of an automatic trap characterized by an automatically settable arrangement which may be sprung successively by any number of animals, resetting itself after each catch so that it is ready to perform another catch.

Still further the invention proposes a rat trap for catching a number of rats although set off by one rat alone, the trap automatically setting itself after each catch.

Still further the invention proposes a settable trap in which the bait cannot be reached by the animals trapped, whereby the trap is always baited.

Still further the invention proposes a rat trap having a trap door formed of a plurality of segments, all tippable at one time and all automatically settable again at one time.

Still further the invention proposes a rat trap having at the bottom of the trap a container, and a suitable provision to let poisonous fumes enter to asphyxiate the trapped rats in order to empty said container safely.

For further comprehension of the invention, and of the objects and advantages thereof, reference will be had to the following description and accompanying drawings, and to the appended claims in which the various novel features of the invention are more particularly set forth.

Fig. 1 is a side elevation of a trap made in accordance with the present invention.

Fig. 2 is a plan view of the trap of Fig. 1.

Fig. 3 is an enlarged section on the line 3—3 of Fig. 2, partly broken away.

Fig. 4 is a plan view of a portion of Fig. 3.

Fig. 5 is a horizontal sectional view through the slotted portions of the lock member and the bell-shaped support, per se, taken on the line 5—5 of Fig. 3.

The automatic rat trap, according to this invention, includes a metal can 10 about the size of an ash can or larger, covered exteriorly with a wire mesh 11. The wire mesh 11 is to provide a ladder for the animals. The can 10 is wider at its bottom than at its top so that the inclined outer wall of the can 10 makes the climbing easier at the outside and makes it impossible for the rats to climb up inside of the can 10. The can 10 is preferably circular in cross section, but may be made of any other desired cross sectional shape, if desired.

A flange 12 extends inwardly from the top portion of the can and supports a removable hoop 13. The hoop 13 is part of the trap door positioned on the top portion of the can 10. Referring to Fig. 2, it will be seen that the trap door further includes twelve pivoted segments 14, each swingable in the manner well known in the construction of trap doors. Thus, there are really twelve segments of the trap door. However, there may be a greater or lesser number of segments 14, if desired. Each segment 14 is pressed out of sheet metal and is substantially triangular in shape with the base at the hoop 13 and curved concentrically with the hoop. The apex of each of the segments 14 is rounded. As will later appear, each segment 14 is pivotally mounted, is counterweighted, and has its apex end in a plane below the plane of its base end. Each segment 14 is independently swingable so that only those segments to which weight is applied will swing. This is important in a trap in which a number of live animals are imprisoned while the trap is still functioning to catch more animals, as it prevents the entrapped animals from jumping up out of the trap door when it is opened by an incoming animal.

Twelve equally spaced lugs 15 extend radially horizontally inwardly from hoop 13. Trunnions 16 extend horizontally from opposite sides of each lug adjacent its inner end. Each segment has a counterweight 17 and engages the adjacent trunnions 16 in a suitable way to assume smooth swinging and easy independent removal for replacement and repair.

A rod 18 which is connected to or made integral with the hoop 13 extends inwardly from the hoop 13 to the center of the can 10, its inner end portion being provided with a vertically orificed boss 19. There may be more than one rod 18 if desired, or the rods may form spokes radiating from a common boss. A vertical rod 20 is mounted in the boss 19 and extends upwardly considerably above segments 14. The upper end of the rod has retainers 21 for holding on the rod a piece of bait such as cheese, a strip of bacon or any other suitable bait. As the bait is at the center of the tippable trap door segments 14, it can never be reached by the rats attempting to eat it, and thus the tray is always baited and ready to catch additional rats.

A nut 22 is secured to rod 20 and a lock member 23 is positioned thereon, nut 22 providing means for properly positioning the lock member 23. The lock member 23 has twelve slots 24 and a flange 25. It is adapted to slide freely up and down a limited distance on rod 20. A bell-shaped support 26 is rigidly mounted on rod 20. It has twelve slots 27, in each of which is pivotally connected, a lever 28.

The inner ends of the twelve levers 28 are received in the twelve slots 24 of the lock member 23. The periphery of the flange 25 is formed with a depending tooth edge 25a, see Fig. 3, which engages fingers 32 of the twelve triggers 31.

Each lever 28, having an end disposed in an aligned slot 24, is adapted to engage the bottom of the slot in the lock member 23. At the other end, each lever 28 is rigidly secured to a trip plate 29, there being twelve of these trip plates, one for each segment 14. Each segment has an offset portion 30 disposed beneath its correlated trip plate 29 and in substantially parallel relation thereto. The trip plates and outer portions of the segments are all in the same horizontal plane.

Each of the levers 28 is pivotally secured in the slots 27 of the bell-shaped support 26 intermediate the ends of the slots. At the end of each slot a trigger 31 is pivotally supported, there being twelve triggers 31, one in each slot. Each trigger comprises a finger 32 coacting with the adjacent tooth edge 25a of the flange 25, a counterweight 33 normally holding the fingers and flange 25 in locking relation, and a support 34 underlying the end of the adjacent portion 30 of the segment 14.

The operation of this form of the device is as follows:

The bait put between the retainers 21 attracts rats or other animals which climb up the wire mesh 11 to the top of the can 10. Any slight tipping of segment 14 out of normal horizontal position that may be caused in manufacture or from wear or tear may be overcome by providing a soft spring 28a to lever 28 at the point 28b which will press portion 30 against support 34 after each resetting of the trap, to avoid the approaching rat's suspicion of the setting of the trap. As soon as it steps on a trip plate 29, this plate tips, it having sufficient clearance relative to the adjacent portion 30. Plate 29 swings its lever 28 which is fulcrumed to the support 26, thereby lifting lock member 23. Flange 25 is thus lifted away from the fingers 32 releasing the trigger 31 associated with trip plate 29 and segment 14. Thus any segment 14, when its trip plate is weighted down by a rat, loses it support 34 of the trigger 31 and swings downward. The plate 29, under the weight of the rat, will also swing downwardly as it operates to release the trigger 31 from the flange 25.

If the rat is standing on two segments and steps on the trip plate of either segment, they will both tip. These foregoing steps happen in very rapid succession, giving the rat no opportunity to retreat. The rat is thus dumped into the can 10. The smooth surfaces of the segments and trip plates afford the rat no foothold to keep from dropping into the can. The rat can not get off the trap once he steps on a trip plate, as the segments 14, being of a large enough size, will not then support his weight. If there are other rats on top of any of the segments at the same time, they will be dumped into the can with the rat that stepped on the trip plate even though they themselves had not stepped on a trip plate. That is to say, the tripping of any one trip plate will release all twelve segments.

As soon as the rat or rats fall into the can, the counterweights 17 swing the segments 14 back to their normal horizontal positions, the triggers 31 pivoting to allow this. Each trigger 31 has an inclined face 35 permitting the return of the respective segment 14. Before the segment 14 returns to its normal position, the respective plate 29 takes its normal position due to the weight of the lock member 23 which is free to return by gravity to its seat on the nut 22, once the first contact with the rat ceases. The swinging movement of the plates 29 is very limited due to the limited lift of the lock member 23. Therefore, the plates 29 are always above portions 30 of the segments 14. Sufficient clearances are provided between the flange 25 and the fingers 32 so that the trap resets itself easily. As soon as the segments 14 and the plates 29 are in their normal positions, the lock member 23 will coact with the triggers 31 and thus automatically reset the trap for other rats. Thus, the trap may be continually set off and re-set automatically as rats continually climb up onto the top of the can after the bait positioned between the retainers 21.

The number of rats that may be caught will be limited only by the size of the can 10. The size of the can 10 is not limited. It will be of sufficiently large content for use in warehouses and around docks where rats are found in large numbers.

A suitable poisonous fume tube 40 is provided for filling the can 10 with sufficient amount of poisonous fumes to asphyxiate the trapped rats therein.

While I have illustrated and described the preferred embodiment of my invention, it is to be understood that I do not limit myself to the precise construction herein disclosed and the right is reserved to all technical and mechanical changes and modifications coming within the scope of the invention as defined in the appended claims.

Having thus described my invention, what I claim as new and desire to secure by United States Letters Patent is:

1. An automatic rat trap comprising a vertical truncated cone-shaped container, a trap-door structure closing the top of said container, said structure having a hoop concentric with said container, a support extending radially inward from said hoop to the center thereof, a vertical rod mounted on said support in said center and extending above said container, a plurality of segment-shaped doors hinged to said hoop, a bell-shaped support secured to said rod having a slot in line with each of said doors, a lever hinged in each of said slots, a trip plate secured to each of said levers, a circular lock member slidably mounted on said rod within said bell-shaped support, having a slot in line with each of said bell-shaped support slots, each of said levers having a part disposed in an adjacent lock member slot, a trigger pivotally secured in each support slot having a finger in said lock member and a supporting portion opposite said finger, and a lock member flange coacting with each of said fingers, said lock member flange being the lower part of said circular lock member, each of said trip plates being disposed above a portion of its correlated door and each of said doors being adapted to be supported at its inner end by the adjacent trigger supporting portion when said lock member flange and fingers are in coacting relation and to be free from being supported when said lock member flange and fingers are out of coacting relation, any one of said trip plates being adapted to be actuated by an animal stepping thereon to move the lock member flange out of coacting relationship with said fingers.

2. An automatic animal trap comprising a vertical container for trapped animals, a trap-door structure closing the top of said container having a plurality of hinged doors, a counterbalance for each door for normally holding said doors in horizontal position, a lock for locking all of said doors against swinging, and a trip-plate for each door, any one of said trip plates being adapted to open said lock to release all of said doors for swinging.

3. An automatic animal trap comprising a vertical container for trapped animals, a trap-door structure closing the top of said container having a plurality of hinged counterbalanced doors, a vertical support, a lock slidably mounted on said support, means coacting with said lock and with each of said doors for holding said doors against swinging, and a trip-plate for each of said doors adapted to lift said lock to terminate coaction of said means with said lock and with said doors, whereby said doors can swing.

4. An automatic animal trap comprising a vertical container for trapped animals, a trap-door structure closing the top of said container having a plurality of hinged counterbalanced doors, a vertical support, a lock slidably mounted on said support, means pivotally connected to said support coacting with said lock and with each of said doors for holding said doors against swinging, and a trip-plate for each of said doors adapted, when stepped on by an animal, to lift said lock to terminate coaction of said means with said lock and with said doors, whereby said doors can swing downwardly to dump said animal into said container.

5. An automatic animal trap comprising a vertical container for trapped animals, a trap-door structure closing the top of said container having a plurality of hinged counterbalanced doors, a vertical support, a lock slidably mounted on said support, means pivotally connected to said support coacting with said lock and with each of said doors for holding said doors against swinging, and a trip-plate for each of said doors adapted, when stepped on by an animal, to lift said lock to terminate coaction of said means with said lock and with said doors, whereby said doors can swing downwardly to dump said animal into said container, said doors being returnable by their counterbalances and said lock being returnable by gravity to reset said trap automatically.

6. An automatic animal trap comprising a vertical truncated cone-shaped container for trapped animals, a trap-door structure closing the top of said container having a plurality of hinged counterbalanced, segment-shaped doors, a vertical support extending above said doors at the center thereof, a lock slidably mounted on said support, trigger means pivotally connected to said suport coacting with said lock and with each of said doors for holding said doors against swinging, and a trip-plate for each of said doors adapted, when stepped on by an animal, to lift said lock to terminate coaction of said means with said lock and with said doors, whereby said doors can swing downwardly to dump said animal into said container, said support having a portion above said doors adapted to carry bait for said trap.

7. An automatic animal trap comprising a vertical container for trapped animals, a trap-door structure closing the top of said container having a plurality of hinged counterbalanced doors, each having an inner offset portion, a vertical support, a lock slidably mounted on said support, means pivotally connected to said support coacting with said lock and with each of said offset portions for holding said doors against swinging, and a trip-plate disposed over each of said offset portions adapted when stepped on by an animal, to lift said lock to terminate coaction of said means with said lock and with said offset portions, whereby said doors can swing downwardly to dump said animal into said container.

FRANK J. EDELMAN.

REFERENCES CITED

The following references are of record in the file of this patent:

UNITED STATES PATENTS

| Number | Name | Date |
| --- | --- | --- |
| 81,596 | Campbell | Sept. 1, 1868 |
| 207,528 | King | Aug. 27, 1878 |
| 385,086 | Belden | June 26, 1888 |
| 1,217,350 | Saxon and Lundy | Feb. 27, 1917 |
| 1,261,273 | Neely | Apr. 2, 1918 |